United States Patent [19]

Okutani et al.

[11] Patent Number: 4,960,573

[45] Date of Patent: Oct. 2, 1990

[54] RECOVERING METHOD OF CATALYTIC COMPONENT AND CARRIER FROM WASTE CATALYST

[76] Inventors: Takeshi Okutani; Yoshinori Nakata; Masaaki Suzuki, all of 17-2-1 c/o Agency of Industrial Science and Tecnology, Government Industrial Development Laboratory, Tsukisamu-Higashi 2-jyo, Toyohira-ku, Sapporo-shi, Hokkaido; Takeo Akiyama, 771, Kozono, Ayase-shi, Kanagawa-ken, all of Japan

[21] Appl. No.: 293,897

[22] Filed: Jan. 5, 1989

[30] Foreign Application Priority Data

Jan. 22, 1988 [JP] Japan .................................. 63-12296

[51] Int. Cl.$^5$ ...................... C01G 55/00; C22B 11/06; C01B 33/08; B01J 27/224
[52] U.S. Cl. ...................................... 423/22; 423/343; 423/491; 502/35; 502/178

[58] Field of Search .................... 502/35, 178; 423/22, 423/343, 491; 75/83, 112

[56] References Cited

U.S. PATENT DOCUMENTS

| | | | |
|---|---|---|---|
| 3,173,758 | 3/1965 | Secord | 423/343 |
| 4,182,747 | 1/1980 | Gravey et al. | 423/491 |
| 4,327,062 | 4/1982 | Iwai et al. | 75/112 |

FOREIGN PATENT DOCUMENTS

| | | | |
|---|---|---|---|
| 73098 | 4/1944 | Czechoslovakia | 423/22 |
| 63880 | 4/1971 | German Democratic Rep. | 423/22 |
| 96322 | 5/1987 | Japan | 75/83 |
| 256929 | 11/1987 | Japan | 75/83 |

*Primary Examiner*—Paul E. Konopka

[57] ABSTRACT

Disclosed is a recovering method of a catalytic substance and a carrier from a waste catalyst which comprises subjecting the waste catalyst composed of a catalyst prepared by supporting a catalytic substance on a carrier composed of pourous silicon carbide to chlorinating treatment and then recovering the catalytic substance and the carrier in the form of chlorides.

6 Claims, No Drawings

RECOVERING METHOD OF CATALYTIC COMPONENT AND CARRIER FROM WASTE CATALYST

BACKGROUND OF THE INVENTION

This invention relates to a recovering method of catalytic components of a catalyst, more particularly, it relates to a method of separating and recovering a metal and a carrier from a catalyst which employs, as a carrier, porous silicon carbide prepared from silicon carbide powder using silicon-accumulated biomass such as rice hull and/or rice straw, or a porous silicon carbide prepared from silicon metals, silicon-containing ore, organic silicon compounds, etc. by a chlorinating treatment.

Heretofore, regarding the representative examples of the metal-supported catalysts, there has been known catalysts carried a noble metal such as platinum, rhodium, palladium, etc. Metals which are catalytic components have heretofore been utilized as a reduction-oxidation catalyst for oxidation of ammonia, production of hydrogen cyanide, reforming of petroleum, etc. since these metals absorb hydrogen and oxygen so that the absorbed hydrogen and oxygen are activated.

In recent years, accompanying abrupt popularization of automobiles, air pollution due to their exhaust gases becomes remarkable so that purification of exhaust gas using a catalyst has been carried out by removing unburned hydrocarbon (HC), carbon monoxide (CO), nitrogen oxide ($NO_x$), etc. which are harmful substances in exhaust gas of automobiles. As a catalyst for purifying exhaust gas of automobiles, platinum group metals including platinum have mainly been used. Also, in combustion equipments such as a boiler, in addition to CO, $NO_x$, i.e., thermal $NO_x$ is generated by the reaction of nitrogen and oxygen in air at a temperature of 1500° C. or higher whereby pollution is brought about. Thus, in order to restrain the generation of the above thermal $NO_x$ or CO, research on catalytic combustion has been carried out to effect the oxidation reaction at the surface of the catalyst and to conduct perfect combustion at a relatively low temperature which do not generate any thermal $NO_x$ or CO. This catalytic combustion is in principle the same with that of the catalyst for purification of exhaust gas from automobiles.

As the noble metal-supported catalysts, there may be mentioned a pellet catalyst in which a noble metal such as platinum, rhodium, palladium, etc. is supported to an active alumina having a cylindrical shape or spherical shape, or a monolith catalyst in which a catalytic substances such as alumina support and platinum, etc. are coated on a cordierite ($2Al_2O_3.5SiO_2.2MgO$) ceramics having numbers of penetrated gas passages, and this catalyst is practically used.

The noble metals such as platinum, etc. used as the active substance for the catalyst are generally expensive since they are rare resources. Thus, it is desired to recover these noble metals from waste catalysts to reuse them, and various recovering methods are being investigated. As the recovering methods, it has been known, for example, (1) the acid dissolution method and (2) the fusing method.

Among these methods, the acid dissolution method of (1) is a method in which noble metals such as platinum, etc. in a waste catalyst is dissolved by aqua regia (hydrochloric acid : nitric acid = 3 : 1) to recover them as a chloride after pulverizing a waste catalyst. This method is simple and it has been built up for a long time, but disposal of acids, or reuse or regeneration of a carrier is impossible. Further, for disposal of the recovered material, it must be carried out after removing an acid adhered onto the waste support crushed so that the method has disadvantages that the post-treatment is complicated. Also, among the noble metals, while platinum is dissolved in aqua regia and palladium is dissolved in nitric acid, sulfuric acid or hydrochloric acid, rhodium is insoluble even in aqua regia. Therefore, it is employed the method in which the metal is to be made a chloride by using an active nascent chlorine obtained by electrolyzing hydrochloric acid and then dissolved in hydrochloric acid. However, in this method, there are problems in disposal of waste acids and residue after extraction whereby it has a disadvantage that reuse or regeneration of a carrier is impossible.

On the other hand, the fusing method is a method in which a waste catalyst is heated to a high temperature to fuse a noble metal and the noble metal is recovered by separation from carrier. It is necessary to heat the temperature not less than the melting point of the noble metal (platinum: 1774° C., rhodium: 1966° C., palladium: 1550° C.), and an electric furnace, an arc furnace, a direct current plasma, and the like are used as the heating means. In this method, since a carrier is also heated to a high temperature, the carrier substance causes crystallization and sintering, whereby reuse thereof becomes impossible. That is, for example, activated alumina ($\gamma$-alumina) crystallizes into $\alpha$-alumina at the temperature of 1000° C. or higher and causes sintering so that the surface area thereof abruptly decreases whereby reuse thereof as a carrier for the catalyst becomes impossible. Further, in spite of the amount of the noble metal supported on the carrier is little (generally about 0.1% by weight), whole catalyst including a carrier (about 99.9% by weight) must be heated, whereby the method has a disadvantage that efficiency in energy is extremely bad. Also, since a part of the noble metal fused remains on a carrier, it has a problem of bad in recovery.

As stated above, there exists many problems in recovery of a noble metal (catalytic substance) from a waste catalyst, and particularly, an effective method in which a carrier substance is effectively recovered and regenerated as well as a noble metal is recovered at the same time has not yet been developed.

SUMMARY OF THE INVENTION

An object of the present invention is to provide a method for recovering a metal, which is a catalytic substance, and a carrier from a waste catalyst effectively.

The present inventors have studied intensively, and as a result, they have found that the method for recovering a catalytic substance and a carrier as chlorides effectively whereby accomplished the present invention.

That is, the recovering method of a catalytic substance and a carrier from a waste catalyst comprises subjecting the waste catalyst composed of a catalyst prepared by supporting a catalytic substance on a carrier composed of porous silicon carbide to chlorinating treatment and then recovering the catalytic substance and the carrier in the form of chlorides.

DESCRIPTION OF THE PREFERRED EMBODIMENTS

In the following, the present invention will be described in more detail.

The porous silicon carbide referred to in the present invention means a material prepared from a silicon-source substance such as a silicon-accumulated biomass (that is, a plant containing silica component (silicon-accumulated plants), or a part thereof such as a leaf, a stem, etc. more specifically, there may be mentioned rice hull, wheat chaff, straw of a rice, wheat, etc., a bamboo leaf or stem, a leaf or straw of corn, sugar cane or scouring rush, etc.), silicon metal, silica-containing ore, polycarbosilane (an organic compound containing Si-C bond as a main component), etc. with a carbon-source substance such as coal cokes, oil cokes, charcoal, active carbon, or methane.

A catalytic substance of the present invention may preferably include a noble metal, more specifically, may include platinum, rhodium, palladium, and the like.

The catalyst comprising supporting a catalytic substance on a carrier composed of a porous silicon carbide of the present invention is a pellet catalyst which is prepared by the dipping method in which powder of the above-mentioned porous silicon carbide is mold to pellet-like shape and then it is dipped in a solution containing a catalytic substance for a predetermined time to adsorb and support the catalytic substance on the carrier, or by the impregnating method in which a solution of the catalytic substance is impregnated in a carrier with an amount corresponding to a pore volume of a pellet. Also, it may be a monolith catalyst prepared by molding and sintering a porous silicon carbide with an appropriate temperature and dipping or impregnating a catalytic substance to be supported thereon with the same method as mentioned above.

Further, in the present invention, it may be made a monolith catalyst in which a coating layer (a covering layer) comprising a porous silicon carbide supported a platinum, etc. which are catalytic substances is provided on cordierite ceramics carrier having numbers of penetrated gas passages.

For recovering a noble metal, etc. which are the catalytic substances, as well as a porous silicon carbide which is a carrier from a waste catalyst after usage of the above catalyst, said waste catalyst is subjected to a chlorinating treatment or chlorination with or without crushing it. At the chlorinating treatment, respective reaction system such as fluidized bed, fixing bed, moving bed, etc. is employed and the reaction is carried out at the chlorinating treatment temperature of 600° to 1000° C., preferably 800° to 1000° C. by exposing the waste catalyst to chlorine gas. If the temperature is less than 600° C., conversion of SiC to SiCl$_4$ becomes near to 0%, and if it exceeds 1000° C., problem occurs in selection of materials for the chlorinating apparatus while SiC is completely chlorinated, so that they are not preferred. Accordingly, the chlorination should be carried out at the temperature less than 1000° C., preferably at the temperature as low as possible.

A flow amount of the chlorine gas is optionally determined depending upon an amount of a sample (waste catalyst), or a size of the reactor and a method (fluidizing bed, fixing bed or moving bed).

By the above chlorinating treatment, a porous silicon carbide which is a carrier is converted into silicon tetrachloride (SiCl$_4$) having a boiling point of 56.8° C. with a conversion of 100%, and under the above condition, it becomes a vapor whereby trapped and recovered at the outlet of the reaction system.

On the other hand, a catalytic substance becomes a chloride by chlorination. For example, in the case of platinum, it is converted into PtCl$_2$, PtCl$_3$, PtCl$_4$, etc., in the case of rhodium, it is converted into RhCl$_3$, and in the case of palladium, it is converted into PdCl$_2$, respectively.

$$SiC + 2Cl_2 \rightarrow SiCl_4 + C$$

$$Pt + Cl_2 \rightarrow PtCl_2, PtCl_3, PtCl_4$$

$$2Rh + 3Cl_2 \rightarrow 2RhCl_3$$

$$Pd + Cl_2 \rightarrow PdCl_2$$

The residue due to the chlorinating treatment comprises a chloride of the noble metal which is a catalytic substance and carbon, and the chloride of platinum or palladium can be recovered by dissolving in water or a diluted hydrochloric acid.

Since RhCl$_3$ is insoluble in water or an acid, it can be recovered by, after making an Rh-Pb alloy by heating with metal Pb, selectively dissolving Pb from the alloy with HNO$_3$ and subjecting the precipitation separation method which recovers Rh. Also, it may be recovered by reacting with an alkali metal chloride to make alkali rhodium chloride which is soluble in water.

Further, in the present invention, in order to enhance the recovery, after addition of potassium salt to a waste catalyst, the chlorinating treatment should be carried out. Such a potassium salt may include, for example, potassium chloride (KCl), potassium hydrogen sulfide (KHSO$_4$), potassium sulfate (K$_2$SO$_4$), potassium nitrate (KNO$_3$), etc. An amount thereof to be added is preferably 0.001 to 0.2 g per 1 g of the waste catalyst (0.1 to 20% by weight based on the waste catalyst). The potassium salt may be added in the form of powder as it were, or may be added by using the method in which the waste catalyst is dipped in a potassium salt solution to impregnate the salt therein. Also, by the chlorinating treatment using the potassium salt, Rh in the waste catalyst becomes K$_3$RhCl$_6$ which is soluble in water (while RhCl$_3$ is insoluble in water or an acid). Accordingly, as in the PtCl$_2$, PtCl$_3$, PtCl$_4$ and PdCl$_2$ which are formed by the chlorinating treatment of Pt and Pd, K$_3$RhCl$_3$ dissolves in water or a diluted acid whereby recovering thereof becomes easy.

According to the method of the present invention, the porous silicon carbide which is a carrier can be recovered as silicon tetrachloride, and the silicon tetrachloride can be used again as a resource of materials for artificial quartz, ceramics, optical fiber, organic silicon compound, etc. Also, the catalytic substance recovered can be reused by supporting to a carrier again in the form of chloride, or may be used in other use by recovering it as a metal.

Also, in the present invention, it can be considered that a chlorine is a mere medium for recovering Si, pt, Pd or Rh from a waste catalyst, and thus, ideally, it is possible to make the closed system which does not release the chlorine out of the recovering system.

As stated above, according to the recovering method of a catalytic substance and a carrier from a waste catalyst of the present invention, these substances can be recovered effectively by the chlorinating treatment whereby reuse of resources can also be possible.

EXAMPLES

EXAMPLE 1

A rice hull containing 7 to 9% of water is solidified under the temperature of 200° to 300° C., and the pressure of 50 to 150 ton/cm$^2$. Then, this solid material was ground to rice hull powder having a particle size of 152 μm or less by using a pulverizing machine.

By using the above rice hull powder as a starting material, silicon carbide powder was prepared. That is, the rice hull powder was subjected to heat treatment under argon gas atmosphere at the temperature of 700° C. for 3 hours to prepare coked rice hull. Then, under argon gas atmosphere, heat treatment was subjected to at 1550° C. for 2 hours to prepare a mixture of silicon carbide (β-SiC) and carbon.

The above mixture of silicon carbide and carbon was further subjected to heat treatment at the temperature of 650° C. for 2 hours in air to burn out the carbon whereby silicon carbide was obtained.

To the thus obtained silicon carbide was supported 1% by weight of platinum. That is, 0.5 g of silicon carbide powder was accurately weighed, and 20 ml of a platinic chloride solution containing 5 mg of platinum was added to the powder and the mixture was allowed to stand at room temperature for 12 hours. Thereafter, a liquid contained in the mixture was evaporated by using a rotary evaporator to obtain silicon carbide supported by 1% by weight of platinum. Then, this silicon carbide powder was sintered in air at the temperature of 600° C. for 1.5 hours to obtain a platinum-supported silicon carbide catalyst.

By using the above catalyst, the following chlorinating treatment was carried out.

That is, in a horizontal electric furnace, a reaction tube made of quartz having a inner diameter of 30 mm was placed, and a boat made of aluminum filled with 0.5 g of the platinum-supported silicon carbide catalyst was placed at the center in the reaction tube. Then, after replacement of the tube with argon (Ar) gas, Ar was flowed with a flowing rate of 100 ml/min and the tube was heated to the predetermined temperature of 600° to 1000° C. at the heating rate of 26° C./min. Then, the flowing gas was changed to a chlorine gas with a flowing rate of 100 ml/min and the chlorine gas was contacted to the catalyst at the predetermined temperature for one hour. After one hour, the flowing gas was changed to Ar and the temperature was lowered to the room temperature, and then the weight of the catalyst was accurately weight to measure decreased amount thereof. For analysis of the reaction residue, the whole residue (black in color) was put into a diluted hydrochloric acid (0.2 N). The residue adhered to the inner wall of the reaction tube was washed with the diluted hydrochloric acid. This reaction residue in hydrochloric acid solution was filtered and the filtration residue washed with hot water and then the amount of platinum in the filterate was determined by using an atomic absorption spectrometer. The residue (solid material) remained on the filter paper was unreacted β-SiC and C, and weighed after ignition, and then β-SiC in the residue was determined. According to the X-ray diffraction analysis of the reaction residue at the reaction temperature of 600° C., it was confirmed to be β-SiC. However, at the reaction temperature of 900° C., the reaction residue was little and analysis was impossible.

SiCl$_4$ which is the reaction product was trapped by cooling a reaction tube outlet gas with methanol-dry ice trap and formation of SiCl$_4$ was confirmed.

By the operations as mentioned above, the conversion of SiC to SiCl$_4$ {[(β-SiC amount of support)-(β-SiC amount of residue)]/(β-SiC amount of support)×100 (%)} and the recovery of platinum [(recovered platinum amount/supported platinum amount)×100 (%)] were measured at which the treatment was carried out by varying the temperature of the chlorination. The results are shown in Table 1.

TABLE 1

| Temperature of the chlorination (°C.) | Conversion of SiC to SiCl$_4$ (%) | Recovery of Pt (%) |
|---|---|---|
| 600 | 6.6 | 99.8 |
| 800 | 90.3 | 99.7 |
| 900 | 96.4 | 99.8 |
| 1000 | 99.0 | 99.8 |

As clearly seen from Table 1, it is confirmed that recovering of silicon carbide and platinum can effectively be carried out. Particularly, it can be confirmed that platinum can be recovered with almost all the amount.

EXAMPLE 2

To a commercially available β-SiC (an average particle diameter: 0.4 μm, surface area: 18 m$^2$/g) was supported platinum by the same method as in Example 1 to prepare a catalyst.

By using the catalyst thus prepared, the chlorination was carried out in the same manner as in Example 1, and the conversion of SiC to SiCl$_4$ and the recovery of platinum were measured in the same manner as mentioned above. The results are shown in Table 2.

TABLE 2

| Temperature of the chlorination (°C.) | Conversion of SiC to SiCl$_4$ (%) | Recovery of Pt (%) |
|---|---|---|
| 900 | 72.6 | 99.8 |
| 1000 | 99.0 | 99.7 |

As clearly seen from Table 2, while the recoveries of platinum are the same with those of Example 1, the recovery of the carrier is slightly lowered.

EXAMPLE 3

After 10% by weight of potassium salt (KHSO$_4$ and KCl, both commercially available products, reagent grade) based on SiC was added to the platinum-supported silicon carbide catalyst prepared in Examples 1 and 2, the chlorinating treatment was carried out. The addition of the potassium salt was carried out by mixing 0.5 g of the catalyst and 0.05 g of the potassium salt in a planetary ball mill having an inner volume of 12 ml for 5 minutes.

By using the above catalysts, the chlorinating treatment was carried out in the same manner as in Example 1, and the conversion of SiC to SiCl$_4$ and the recovery of platinum were measured in the same manner as mentioned above. The results are shown in Table 3.

TABLE 3

| Temperature of the chlorination (°C.) | Starting material for preparation of SiC | Potassium salt | Conversion of SiC to SiCl$_4$ (%) | Recovery of Pt (%) |
|---|---|---|---|---|
| 800 | Rice hull powder | KHSO$_4$ | 99.6 | 99.9 |
| 900 | Rice hull powder | KHSO$_4$ | 99.4 | 100.0 |
| 900 | Rice hull powder | KCl | 99.0 | 99.8 |
| 900 | Marketing SiC | KHSO$_4$ | 93.4 | 99.8 |
| 1000 | Rice hull powder | KHSO$_4$ | 99.7 | 99.7 |

As clearly seen from Table 3, it can be confirmed that the recovery of the carrier is improved by addition of the potassium salt. Also, the recovery of platinum was substantially 100%.

EXAMPLE 4

To the silicon carbide carrier prepared in Example 1 were supported 1% by weight of platinum, 0.5% by weight of rhodium and 0.5% by weight of palladium. That is, 0.5 g of silicon carbide powder was accurately weighed, and then 20 ml of a platinic chloride (H$_2$PtCl$_6$.6H$_2$O) solution containing 5 mg of platinum, 10 ml of a rhodium chloride (RhCl$_3$.3H$_2$O) solution containing 2.5 mg of rhodium and 10 ml of a palladium chloride (PdCl$_2$) solution containing 2.5 mg of palladium were each added thereto. After allowed to stand at room temperature for 12 hours, liquid was evaporated by using a rotary evaporator to obtain silicon carbide supported thereon 1.0% by weight of platinum, 0.5% by weight of rhodium and 0.5% by weight of palladium, respectively. Then, this silicon carbide powder was calcinated in air at the temperature of 600° C. for 1.5 hours to obtain platinum, rhodium and palladium-supported silicon carbide catalyst.

By using the above catalyst, the chlorinating treatment was carried out at 900° C. in the same manner as in Example 1, and the conversion of SiC to SiCl$_4$ and the recoveries of platinum, rhodium and palladium were measured.

Whole amount of the reaction residue was added into a diluted hydrochloride solution (0.2 N). The residue adhered to inner portion of the reaction tube was also washed with the diluted hydrochloride solution and the diluted hydrochloride solutions were combined. The mixture of the diluted hydrochloride solutions and the reaction residue were filtered and washed with hot water, and platinum and palladium in the filtrate were determined by using an atomic absorption spectrometer. Also, the residue (solid material) remained on the filter paper was laid in ashes and weighted accurately. To the ashes was added 0.2 g of NaCl and the mixture was placed in a boat made of alumina and subjected to heat treatment at 700° C. in a chlorine gas stream for one hour. By this treatment, RhCl$_3$ in the residue was converted into sodium hexachlororhodiumate (Na$_3$RhCl$_6$) which is soluble in water. This material was dissolved in a predetermined amount of water, filtered and rhodium in the filtrate was determined by an atomic absorption spectrometer. The amount of unreacted SiC was determined by subtraction the amount of RhCl$_3$ from the amount of residue.

From the results obtained by the above method, the conversion of SiC to SiCl$_4$ and the recoveries of platinum, rhodium and palladium are shown in Table 4.

TABLE 4

| | |
|---|---|
| Conversion of SiC to SiCl$_4$ (%) | 97.2 |
| Recovery of Pt (%) | 99.5 |
| Recovery of Pd (%) | 99.7 |
| Recovery of Rh (%) | 98.2 |

As clearly seen from Table 4, it can be understood that almost all the amount of SiC carrier, platinum, rhodium and palladium can be recovered.

We claim:

1. A method of recovering a catalytic substance comprising at least one noble metal and a carrier from a waste catalyst composed of a catalyst prepared by supporting a catalytic substance on a carrier composed of porous silicon carbide which comprises the steps of:
   adding a potassium salt selected from the group consisting of potassium chloride (KCl), potassium hydrogen sulfide (KHSO$_4$), potassium sulfate (K$_2$SO$_4$) and potassium nitrate (KNO$_3$) to the waste catalyst in an amount of 0.1 to 2% by weight based on the weight of the waste catalyst,
   subjecting the mixture to a chlorinating treatment at a temperature of about 600° to 1000° C. and then
   recovering the catalytic substance and the carrier in the form of chlorides.

2. A method of recovering a catalytic substance and a carrier from a waste catalyst according to claim 1, wherein said chlorinating treatment employs a reaction system selected from the group of fluidized bed, fixing bed and moving bed.

3. A method of recovering a catalytic substance and a carrier from a waste catalyst according to claim 1, wherein said chlorinating treatment is carried out at a temperature of about 800° to 1000° C.

4. A method of recovering a catalytic substance and a carrier from a waste catalyst according to claim 1, wherein said porous silicon carbide is a material prepared from a silicon-source substance selected from the group consisting of a silicon-accumulated biomass, silicon metal, silica-containing ore, polycarbosilane with a carbon-source substance selected from charcoal, active carbon or methane.

5. A method of recovering a catalytic substance and a carrier from a waste catalyst according to claim 4, wherein said silicon-accumulated biomass is selected from a plant containing silica component or silicon-accumulated plants, or a part thereof.

6. A method of recovering a catalytic substance and a carrier from a waste catalyst according to claim 4, wherein said silicon-accumulated biomass is selected from rice hull, wheat chaff, straw or a rice, wheat, a bamboo leaf or stem, a leaf or straw of corn, sugar cane and scouring rush.

* * * * *